Aug. 7, 1956 T. PETERSEN 2,757,392
CHIP CLEARING SCREW CUTTING DIE
Filed June 6, 1951

Inventor
Thorwald Petersen
By Ralph Hammar
Attorney

United States Patent Office 2,757,392
Patented Aug. 7, 1956

2,757,392

CHIP CLEARING SCREW CUTTING DIE

Thorvald Petersen, Erie, Pa., assignor to Reed Manufacturing Company, Erie, Pa., a corporation of Pennsylvania Application June 6, 1951, Serial No. 230,214

1 Claim. (Cl. 10—111)

In pipe threading dies the action of the chasers is adversely affected by the presence of chips. In the case of guide chasers, small chip fragments tend to sinter or weld to the root of the guide threads thereby causing tearing of the threads and affecting the centering action of the guide chasers. This invention is intended to eliminate the chip problem. The chips are deflected to the rear of the threads being cut by striking against a beveled cam surface on the die. Enlargements are provided in the root of the guide chaser threads so the chip fragments cannot weld or stick in the guide chaser threads. The combined effect is longer service life and more accurate and easier thread cutting. Further objects and advantages appear in the specification and claim.

Figure 1:
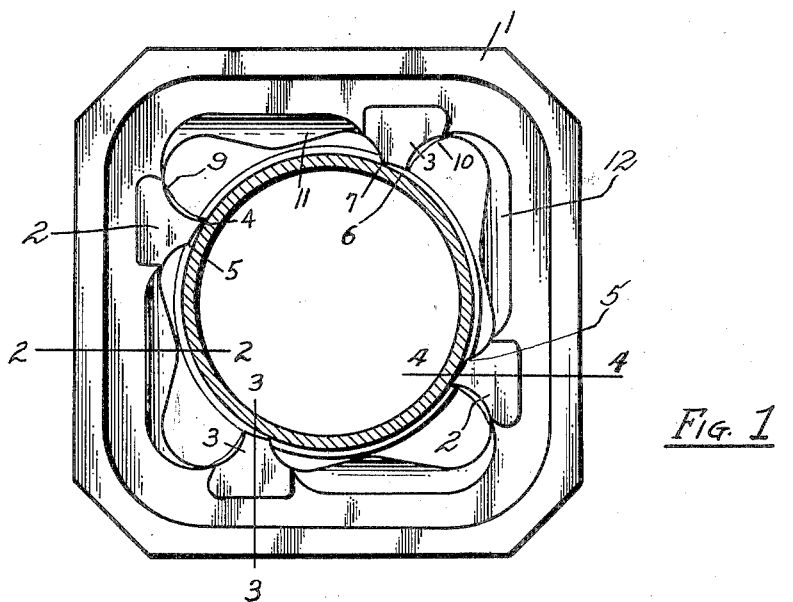
Figure 2:
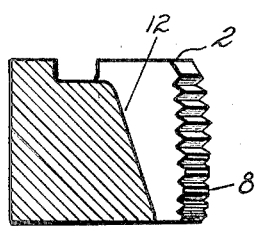
Figure 3:
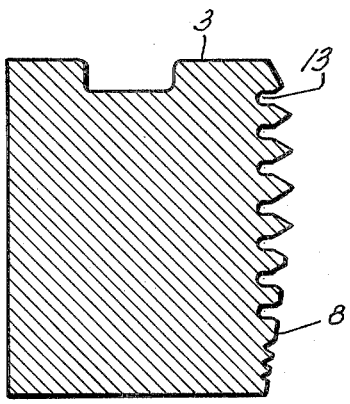
Figure 4:
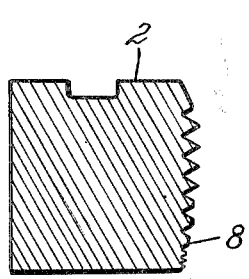

In the drawing Fig. 1 is an elevation of a solid pipe die; and Figs. 2–4 are sections on the correspondingly numbered lines of Fig. 1.

In the drawings, the invention is shown applied to a solid screw cutting die as shown in my Patent 2,166,369. As more fully explained in the patent, the die has a body 1 with alternate cutting chasers 2 and guide chasers 3 there being two chasers of each kind. The cutting chasers 2 having cutting edges 4 at the front or leading edges as the die is threaded onto the pipe and the trailing edges 5 are relieved so as to normally clear the threads cut by the cutting edges 4. On the guide chasers 3, the front or leading edges 6 of the chasers are positioned farther from the axis so as to clear or ride above the surface of the threads and the trailing edges 7 ride on the threads and guide or center the die so that the cutting chasers 2 cut uniformly. As brought out in Figs. 2, 3 and 4, each of the cutting and guide chasers 2 and 3 has an inclined throat 8 which flares outward to a larger diameter than the crest diameter of the threads being cut. The throat sections 8 of both the guide and cutting chasers 2 and 3 are usually formed with cutting edges so that all four chasers have throats which make the preliminary cuts. Both the cutting and guide chasers ordinarily are given a slight axial inclination or rake so that the chips from the throat section and from the cutting edges 4 are started away from the threads being cut. From one aspect, the throat sections 8 lead the cutting edges 4 as regards the direction of rotation of the die. The parts so far described are disclosed in greater detail in my above mentioned patent.

It is desirable that the chips be deflected to the rear of the threads being cut so that the chips will not interfere with the cutting action of the chasers. The chips leaving the cutting edges 4 or the corresponding cutting edges on the throats 8 tend to curl in helixes of somewhat greater curvature than the curvature of the front surfaces 9 and 10 of the cutting and guide chasers. The chips follow around the surfaces 9 and 10 and strike against beveled surfaces 11 and 12 in front of the cutting and guide chasers. As shown in Fig. 2 the surfaces are inclined so as to deflect the chips rearward of the throats 8 or in other words to deflect the chips to the rear of the teeth being cut. This is opposite to the usual inclination. The result is that as the die is threaded onto the pipe, the chips are pushed out over the end of the pipe or in a direction opposite to the movement of the die along the pipe. The lead or rake of the cutting edges 4 and of the throats 8 is insufficient to achieve this result. This result is obtained from the slope of the surfaces 11 and 12.

In order to prevent sticking of chip segments in the root of the threads of the guide chasers 3, the roots of the guide chaser threads are deepened and widened as shown at 13 in Fig. 3 so as to clear the crests of the threads cut by the cutting chasers 2. By providing the wide grooves 13, the sticking of chips in the threads of the guide chasers is absolutely prevented. Apparently the sticking or welding of the chips is due to the wedging action enhanced by the relief of the leading or front edges 6 of the guide chasers. The grooves 13 provide the necessary clearance so that the grooves do not ride on the crests of the teeth cut in the pipe and chip fragments do not have a chance to stick or weld to the grooves. The size of the grooves 13 is not critical. Satisfactory performance has been obtained where the grooves 13 were wide enough so as to intersect the pitch diameter of the threads. There is no problem of chip fragments sticking in the threads of the cutting chasers 2. The relief in back of the cutting edges 4 prevents any wedging of the chip fragments. The problem of sticking of chip fragments in the guide chasers is of long standing and very troublesome. The chips stick so tightly that they cannot be dislodged but must be cut out of the thread grooves. The sticking of the chip fragments is one of the causes of tearing of the threads.

What is claimed as new is:

In a screw cutting die for threading pipe and the like, alternate toothed cutting and guide chasers each having at one end throats flaring outward for starting the cutting of the threads and having front edges shaped to curl the chips in front of the chasers, the teeth on the cutting chasers and on the throats of the cutting and guide chasers being relieved toward the rear and remaining teeth on the guide chasers being relieved toward the front, said latter teeth having grooves extending below the normal root diameter so as to clear the crests of the threads cut by the cutting chasers, said grooves providing clearance preventing sticking of chips fragments in the guide chaser teeth, and axially extending cam surfaces sloping radially outward toward the end of the chasers opposite the throats for deflecting the curled chips out said opposite end.

References Cited in the file of this patent

UNITED STATES PATENTS

| 1,293,432 | Higgins | Feb. 4, 1919 |
| 1,524,235 | Germain et al. | Jan. 27, 1925 |
| 2,096,810 | Judge | Oct. 26, 1937 |
| 2,150,037 | Reed et al. | Mar. 7, 1939 |
| 2,166,369 | Petersen | July 18, 1939 |

FOREIGN PATENTS

| 233,238 | Germany | Jan. 19, 1909 |